I. COOPER.
CLAMP.
APPLICATION FILED JUNE 21, 1917.

1,252,323.

Patented Jan. 1, 1918.

Inventor
ISIDOR COOPER
By his Attorney

UNITED STATES PATENT OFFICE.

ISIDOR COOPER, OF BROOKLYN, NEW YORK, ASSIGNOR TO OTIS-FLAGG CORPORATION, OF NEW YORK, N. Y., A CORPORATION OF NEW YORK.

CLAMP.

1,252,323.  Specification of Letters Patent.  Patented Jan. 1, 1918.

Application filed June 21, 1917. Serial No. 176,019.

*To all whom it may concern:*

Be it known that I, ISIDOR COOPER, a citizen of the United States, and a resident of Brooklyn, in the county of Kings and State of New York, have invented certain new and useful Improvements in Clamps, of which the following is a specification.

The invention pertains more particularly to clamps of the character employed for binding a piece of hose onto a nipple or pipe, and the object of the invention is to provide a simple and inexpensive clamp capable of being quickly and efficiently applied and also readily adaptable to different diameters of hose or other articles to which it may be applied.

One of the main purposes of the invention is to provide an efficient clamp which may be inexpensive to manufacture and readily adjusted for and applied to varying diameters of hose or pipes, the carrying in stock of a large number of clamps each adapted to some special diameter of hose or pipe being by my invention rendered unnecessary.

The clamp of my invention, aside from the final securing screw and nut, comprises three main parts, one being a ribbon, strip or band of metal and the other two being heads to which the ends of the strip or band are connected and which receive the final securing screw and nut by which the band may be bound upon a piece of hose or the like, one of said heads being adapted to be passed through a hole in a member of the other head and positioned thereby to receive the point of the screw, for which it affords a bearing, and said other head being of substantially right-angular formation and affording a flat bearing on an inner face for a nut to receive the screw which extends through an outwardly extending member of said head and said nut and to said bearing afforded by the other head.

The invention will be fully understood from the detailed description hereinafter presented, reference being had to the accompanying drawings, in which.

Figure 1:
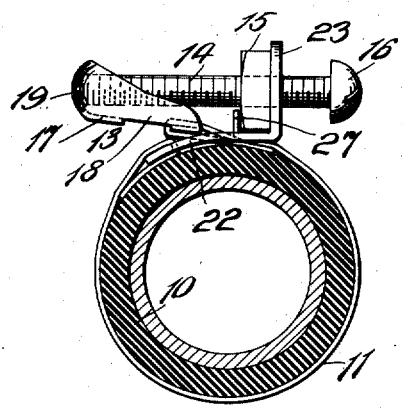
Figure 1 is a transverse section through a piece of hose having the clamp of my invention applied thereto, the clamp being illustrated in side elevation.

In the drawings 10 designates a piece of hose with the clamp of my invention applied thereon and which clamp comprises a flexible metallic strip or band 11, heads 12, 13, to which the ends of said strip or band are respectively connected in an adjustable manner, a screw 14, and a nut 15 which lies against one of said heads and receives the threaded portion of said screw, whose entering end is adapted to engage a bearing afforded by the head 13. The screw 14 will preferably have at one end a slotted head 16 adapted to be engaged by an ordinary screw-driver or the like.

The strip or band 11 is a plain flat strip or ribbon integral from end to end and of uniform width and uncut in any portion, and said strip or ribbon may be of very thin flexible metal and of any length suited to the diameter of the hose 10.

Figure 2:
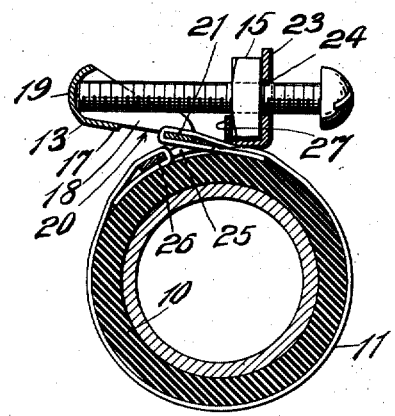
Fig. 2 is a transverse section through the hose with the clamp of my invention applied thereto, said clamp being shown in central longitudinal section.
Figures 3, 4, 5:
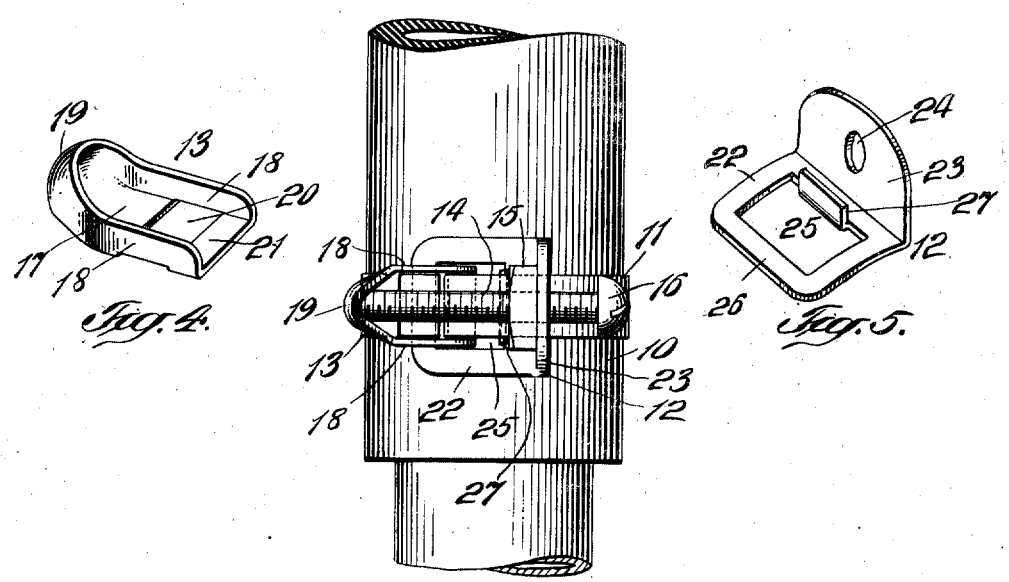
Fig. 3 is a top view of the clamp of my invention applied to a piece of hose engaging a nipple.
Fig. 4 is a perspective view of one of the heads of the clamp, shown on an enlarged scale.
Fig. 5 is a perspective view of the other head of the clamp.

The head 13 is of thicker metal than the strip 11 and is formed with a base member 17, outwardly extending or angular sides 18 and a concave bearing portion 19, the latter being at the outer end of said head. The base member 17 has a transverse opening 20 formed therein, and this provides at the inner end of said base member 17 a cross-bar 21 to receive one end of the strip or band 11 in a manner which will be readily understood on reference to Fig. 2, in which it may be seen that one end of the strip or band 11 is inserted downwardly through the opening 20 in the head 13 and then folded reversely below the cross-bar 21 and below a portion of the strip 11. The sides 18 strengthen the head 13 and with the base portion of said head afford metal for the bearing 19.

The head 12 is a substantially rectangular piece of metal of greater thickness than the strip or band 11 and comprises a curved base member 22 and an outwardly projecting right-angular member 23 containing a hole 24 for the screw 14. The base member 22 of the head 12 is formed with an opening 25 whereby a cross-bar 26 is left to receive one end of the strip or band 11, as illustrated at the left hand side of Figs. 1 and 2, the said end of said strip or band being inserted downwardly through the opening 25 and then folded reversely below the crossbar 26 and below the adjacent portion of the body of the strip or band 11.

In assembling the parts of the clamp for application to a piece of hose, a strip 11 of suitable length may be applied to the heads 12, 13, and adjusted to the diameter of the hose by the character of the folding of the ends of the strip or band around the crossbars 21, 26 of the heads. After the heads have been applied to the band, the head 13 may be inserted through the opening 25 in the head 12 and given approximately the position illustrated in the drawings. The nut 15 may then be applied against the inner face of the member 23 of the head 12, and the screw 14 inserted through the hole 24 in said member 23 and screwed through the nut 15 and firmly against the bearing 19 of the head 13, this having the effect of forcing the heads 12, 13 in a direction from each other and tightening the strip or band 11 upon the hose. The strip or band 11 is flexible and may be adjusted to varying diameters of hose by carrying its end portions to a greater or less extent through the openings in the heads 12, 13. The member 22 of the head 12 is slightly curved so as to be adapted to lie closely against the hose 10, and said member 22 spans the space which may be left between the adjacent ends of the band 11. The ends of the strip or band 11 are preferably not permanently fastened to the heads 12, 13 but simply slipped through the openings in the said heads and bend reversely at the lower sides of the crossbars thereof, the inwardly extending portions of the strip or band 11 becoming rigidly connected with the heads 12, 13 when the clamp is applied to position and said portions are bound against the face of the hose.

The simple construction of the parts of the clamp, the convenience with which said parts may be assembled, and the readiness with which the clamp may be applied to a piece of hose, will be understood and appreciated without extended comment. The strip 11 is not of special construction, being simply a plain uniform strip cut from a roll of the metal and of approximately the length required for binding the hose upon the nipple 9, and this strip at its ends is folded upon and around under the cross-bars 21, 26 of the heads and so folded as to adjust the clamp with proper accuracy to the diameter of the hose. In applying the clamp, the head 13 may be inserted through the opening 25 in the head 12 and thus become opposed to the head 12, so that the screw on forcing said heads apart may tighten the band upon the hose, and when the clamp has been applied the head on each end of the band overlaps the other end of the band.

What I claim as my invention and desire to secure by Letters Patent, is:

1. A clamp of the character described, comprising a flexible strip, independent opposed heads to which the ends of said strip are respectively detachably connected and which heads are of heavier metal than the said strip, and means for forcing said heads in a direction from each other for tightening the clamp upon the article to which it may be applied, comprising a nut and screw, one of said heads being of right-angular formation and affording against the inner face of its outwardly projecting member a bearing surface for the nut and in its base member having an opening to receive one end of the said strip, and the other head having an opening in its base portion to receive the other end of said strip and at its outer end a bearing for the end of said screw.

2. A clamp of the character described, comprising a flexible strip, independent opposed heads to which the ends of said strip are respectively connected and which heads are of heavier metal than said strip, and means for forcing said heads in a direction from each other for tightening the clamp upon the article to which it may be applied, comprising a nut and screw, one of said heads being of right-angular formation and affording against the inner face of its outwardly projecting member a bearing surface for the nut and in its base member having an opening to receive one end of the said strip, and the other head having an opening in its base portion to receive the other end of said strip and at its outer portion having right-angular sides and at its outer end and with said sides forming a concave bearing for the end of said screw.

3. A clamp of the character described, comprising a flexible strip, independent opposed heads having base members containing openings through which the ends of said strip are respectively inserted and then reversely bent back under the adjacent portions of the body of the strip, and means for forcing said heads in a direction from each other for tightening the clamp upon the article to which it may be applied, comprising a nut and screw, one of said heads being of right-angular formation and affording at the inner face of its outwardly projecting member a bearing surface for the nut, and the end of said strip not connected with the base member of said head being threaded through said base member and connected with the other head, and said other head having at its outer end a bearing for the end of said screw.

4. A clamp of the character described, comprising a flexible strip, independent opposed heads having base members containing openings through which the ends of said strip are respectively inserted and then reversely bent back under the adjacent portions of the body of the strip, and means for forcing said heads in a direction from each other for tightening the clamp upon the article to which it may be applied, comprising a nut and screw, one of said heads being of right angular formation and affording a bearing for the nut and the opening in its base member being adapted to have passed through it the other head and its end of said strip, and said other head having a bearing for the end of said screw.

5. A clamp of the character described, comprising a flexible strip, opposed heads having base members to which the ends of said strip are respectively connected and which are of heavier metal than the strip, and a nut and screw for tightening the clamp upon the article to which it may be applied, one of said heads affording a bearing for the nut and having a base member containing an opening through which the other head and its end of said strip may be passed so as to oppose said heads and cause them to overlap opposite ends of the strip, and said other head having a bearing for the end of the screw.

6. A clamp of the character described, comprising a flexible strip having on its ends opposed heads, and a nut and screw therefor for tightening the clamp upon the article to which it may be applied, one of said heads having on its outer end a bearing for said screw, and the other head being of heavier metal than the strip and affording a bearing surface for said nut and having a base member containing an opening through which the first-mentioned head and its end of the strip may be passed so as to oppose said heads and cause them to overlap opposite ends of said strip.

Signed at New York city, in the county of New York and State of New York, this 19th day of June, A. D. 1917.

ISIDOR COOPER.

Witnesses:
ARTHUR MARION,
CHAS. C. GILL.